United States Patent [19]

Aktins et al.

[11] Patent Number: 5,157,747
[45] Date of Patent: Oct. 20, 1992

[54] PHOTOREFRACTIVE OPTICAL FIBER

[75] Inventors: Robert M. Aktins, Millington; Katherine T. Nelson, Gillette; Kenneth L. Walker, New Providence, all of N.J.

[73] Assignee: AT&T Bell Laboratories, Murray Hill, N.J.

[21] Appl. No.: 643,886

[22] Filed: Jan. 18, 1991

[51] Int. Cl.$^5$ .............................................. G02B 6/00
[52] U.S. Cl. ...................................... 385/37; 65/3.11; 385/123
[58] Field of Search ................. 65/3.11, 32.1; 385/31, 385/37, 123, 124, 142

[56] References Cited

U.S. PATENT DOCUMENTS

| | | | |
|---|---|---|---|
| 3,891,302 | 6/1975 | Dabby et al. | 385/37 |
| 3,916,182 | 10/1975 | Dabby et al. | 385/123 |
| 4,212,660 | 7/1980 | Maurer | 65/3.11 |
| 5,022,734 | 6/1991 | Kashyap | 350/96.15 |

FOREIGN PATENT DOCUMENTS

| | | |
|---|---|---|
| 8902334 | 3/1989 | PCT Int'l Appl. |
| 2210470 | 6/1989 | United Kingdom |

OTHER PUBLICATIONS

Osterberg et al., Dye Laser Pumped by Nd:YAG Laser Pulses Frequency Doubled in a Glass Optical Fiber, Optics Letters, vol. 11, No. 8, Aug. 1986, pp. 516-518.

Farries et al., Second-Harmonic Generation in an Optical Fibre, Electronic Letters, vol. 23, No. 7, Mar. 1987, pp. 322-324.

"Photosensitivity in Optical Fiber Waveguides: Application to Reflection Filter Fabrication", by K. O. Hill et al., *Applied Physics Letters*, 32(10), May 15, 1978, pp. 647-649.

"Formation of Bragg Gratings in Optical Fibers by a Transverse Holographic Method", by G. Meltz et al., *Optics Letters*, vol. 14, No. 15, Aug. 1, 1989, pp. 823-825.

"Photorefractivity in GeO$_2$-Doped Silica Fibers", by J. Stone, *Journal of Applied Physics*, 62 (11), Dec. 1, 1987, pp. 4371-4374.

"Photoinduced Refractive-Index Changes in Germanosilicate Fibers", by D. P. Hand et al., *Optics Letters*, vol. 15, No. 2, Jan. 15, 1990, pp. 102-104.

"Effects of Sintering Atmosphere on Defects in SiO$_2$-GeO$_2$ VAD Fiber", by A. Kashiwazaki et al., *Materials Research Society Symposium Proceedings*, vol. 88, 1987, pp. 217-223.

"Fiber Optic Bragg Gratings", United Technologies Photonics: An Introduction, Summary of Photonic Subsystems Capabilities and Facilities, United Technologies Photonics, East Hartford, Conn., 6 pages.

"Multi-Function, Distributed Optical Fiber Sensor for Composite Cure and Response Monitoring", by J. R. Dunphy et al., United Technologies Research Center, Hartford, Conn., 2 pages.

"Measurement of Reduced Germania (GeO) Defect Levels in Optical Fibers by Fluorescence and Absorption Spectroscopy", by R. M. Atkins, *Technical Digest of the Symposium on Optical Fiber Measurements*, Boulder, Colo., 1990, pp. 155-158.

"Long Wavelength Cutoff of Photoinduced Gratings in Photosensitive Glass Fibers", by C. P. Kuo et al., *Applied Optics*, vol. 29, No. 30, Oct. 20, 1990, pp. 4430-4431.

Primary Examiner—W. Gary Jones
Assistant Examiner—John J. Bruckner
Attorney, Agent, or Firm—E. E. Pacher

[57] ABSTRACT

Germanosilicate optical fiber having substantially higher GeO/GeO$_2$ ratio than conventional comparison-fiber is disclosed. The fiber has a loss at wavelength of 330 nm of at least 30 db/m.mole % GeO$_2$. Such fiber can be advantageously used for making in line photorefractive Bragg gratings and other photorefractive fiber components. Fiber according to the invention can be produced by an inside deposition process (e.g., MCVD, PCVD), by an outside deposition process (e.g., VAD, OVD), or even a sol/gel process, and embodiments of the general method of making fiber according to the invention are disclosed.

4 Claims, 1 Drawing Sheet

PHOTOREFRACTIVE OPTICAL FIBER

FIELD OF THE INVENTION

This application pertains to the field of apparatus and systems comprising optical fiber, and to the field of making optical fiber.

BACKGROUND OF THE INVENTION

It is well known that refractive index-gratings can be formed in germano-silicate fiber by exposure of the fiber to radiation of the appropriate wavelength. See for instance K. O. Hill et al., *Applied Physics Letters*, Vol. 32, page 647 (1978). See also G. Meltz et al., *Optics Letters*, Vol. 14, page 823 (1989), wherein the formation of Bragg gratings in germano-silicate optical fibers by a transverse holographic method is reported. J. Stone, *Journal of Applied Physics*, Vol. 62(11), pp. 4371-4374 (1987) reports observation of photorefractivity in $GeO_2$-doped silica fibers, and concludes that the effect increases with increasing $GeO_2$ content. The above publications are incorporated herein by reference.

G. Meltz et al. (op. cit.) report forming Bragg gratings in several different fibers, with core diameters of 2.2 to 2.6 $\mu$m and numerical apertures (NA) of 0.17 to 0.24, corresponding to $GeO_2$ doping of 5 to 12.5 mol %. They also report achieving fractional index perturbations ($\Delta n$) of approximately $3 \times 10^{-5}$, and Bragg filter reflectivities of 50 to 55%. D. P. Hand et al., (*Optics Letters*, Vol. 15(2), pp. 102-104) report achieving $\Delta n$ of $7.27 \times 10^{-5}$ at 488 nm after 8.5 hours exposure to 60 mW/$\mu m^2$ 488 nm radiation. United Technologies product literature announces that the company can produce Bragg gratings in most commercially available fibers, with reflectivities in the range 10-80% (greater than 90% for custom gratings). It is generally believed that a defect is associated with the photorefractive effect in germanosilicate fiber.

Some defects in germano-silicate glass are associated with the presence of $Ge^{2+}$ in the glass. In particular, it has been observed that the concentration of $Ge^{2+}$-associated defects can be decreased if sintering of a VAD-produced porous 90 $SiO_2$: 10$GeO_2$ preform body is carried out in a $O_2$/He mixture, as compared to conventional sintering in He. It has also been observed that sintering of such a body in a $H_2$/He atmosphere results in a preform rod with axially varying Ge-distribution and in the presence of a luminescence center whose key components are a reduced species of Ge and H. See A. Kashiwazaki, et al., *Materials Research Society Symposium Proceedings*, Vol. 88, page 217 (1987).

In general, optical fiber preforms are generally produced under conditions that tend to minimize the likelihood of formation of $Ge^{2+}$-associated defects. For instance, in the MCVD process it is customary to collapse the preform such that the interior surface of the preform tube is in contact with a relatively high concentration of oxygen and small amounts of chlorine.

The relatively small photorefractive effect in typical prior art fibers necessitates relatively long exposure times and frequently results in relatively inefficient and long Bragg reflectors in the fibers. However, it would be highly desirable to be able to efficiently produce relatively short high reflectivity in-line Bragg gratings and other optical components in otherwise conventional germano-silicate optical fiber through the use of the photorefractive effect. It thus would be desirable to have available optical fiber that has a higher concentration of the relevant defect than is typically found in the analogous prior art fiber. This application discloses such fiber, and also discloses methods of producing the fiber.

THE INVENTION

Figure 1:
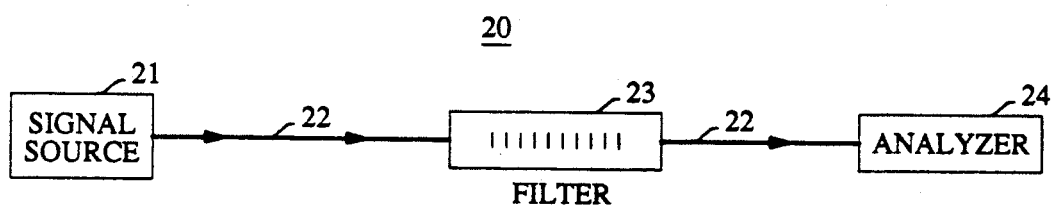
FIG. 1 schematically depicts an exemplary optical fiber sensor system that comprises an in-line grating.

In a broad aspect the invention is apparatus that comprises germano-silicate optical fiber exhibiting a relatively large photorefractive effect, the fiber being capable of a normalized effective refractive index variation $\Delta n$ [$\Delta n = (n_{max} - n_o)/n_o$; $n_{max}$ and $n_o$ are, respectively, the maximum and minimum effective core refractive index along the fiber] that is greater than is possible in prior art fiber of identical design. In a further broad aspect the invention is a method of producing such fiber that comprises drawing the fiber from an intermediate glass body (the "preform"), the method comprising an elevated temperature step during which germanosilicate-containing material is contacted with an atmosphere selected to favor reduction of $Ge^{4+}$ to $Ge^{2+}$, and to result in an increased ratio of $GeO/GeO_2$ in the fiber, as compared to prior art fiber of the same design. By "GeO" we mean herein a particular $Ge^{2+}$-associated defect that has absorption peaks at wavelengths of about 240 and 330 nm.

More specifically, the inventive apparatus comprises fiber having a core and a cladding region surrounding the core, with the core comprising silica and germanium oxide. As is conventional, the core has an effective refractive index that is greater than that of the cladding region, such that electromagnetic radiation of a given wavelength (the "operating" wavelength, e.g., 1.3 $\mu$m) is guided by the fiber. The "effective" index is the refractive index of an equivalent step index fiber, as is well known to those skilled in the art.

Significantly, the fiber has a loss above background at 330 nm that is at least 30 db/m.mole % $GeO_2$ (preferably greater than 50 db/m.mole % $GeO_2$), indicative of the presence of a relatively high concentration of GeO in the core of the fiber. (In prior art fiber the GeO/$GeO_2$ ratio generally is such that the loss at 330 nm typically is at most about 10 db/m.mole % $GeO_2$. The "mole % $GeO_2$" refers to the $GeO_2$ concentration that corresponds to the effective refractive index of the fiber core.) The relatively high concentration of GeO makes possible attainment of previously generally unattainable values of $\Delta n$ (exemplarily $\Delta n > 10^{-4}$ at 488 nm), and thus makes possible, inter alia, formation of efficient in-line Bragg gratings in the fiber. The gratings can be formed by a known procedure, e.g., the holographic method described by Meltz et al. (op. cit.), and some embodiments of the invention comprise fiber that contains an in-line grating.

The loss above background at 330 nm is uniquely associated with the presence of GeO and can be used to establish a relative measure of GeO concentration. Thus, if a first silica-based fiber with Ge-doped core has higher loss above background at 330 nm than a second fiber of identical design (including the identical Ge-concentration in the core) than the first fiber has a larger ratio of GeO to $GeO_2$ than the second fiber.

Fiber according to the invention can be drawn from a preform rod in the conventional manner. The preform rod can be made by an inside deposition process (e.g., MCVD, PCVD) or an outside deposition process (e.g., VAD, OVD), or even by a sol/gel process. In all cases fiber manufacture involves a process step carried out under conditions selected to result in the relatively high GeO/GeO$_2$ concentration that is associated with the desired loss above background at 330 nm of at least 30 db/m.mole % GeO$_2$.

For preform rods made by an inside deposition process the above referred-to process step typically is the collapse step. After conventional deposition of the desired amount of SiO$_2$-based glass (including the desired amount of Ge-doped glass that is to form the core of the fiber) on the inside of an appropriate (typically SiO$_2$) substrate tube, the thus formed composite glass tube is collapsed in conventional manner (typically at about 2200°-2400° C.) except for the atmosphere that is in contact with the inside of the tube. Whereas the collapse atmosphere conventionally contains a high (typically >90%) concentration of O$_2$ and a small concentration of Cl$_2$, in the inventive method the atmosphere is non-oxidizing, desirably being essentially oxygen-free (exemplarily O$_2$ partial pressure $\lesssim$1 Torr). Since, due for instance to loss of oxygen from SiO$_2$, it is frequently difficult to maintain a desired very low level of oxygen, atmospheres that contain a reducing gas or gases (e.g., H$_2$, CO) are also contemplated. Typically the concentration of reducing gas is relatively small, exemplarily <10%, the remainder consisting typically of an inert gas, e.g. He and, optionally Cl$_2$.

If the preform rod is made by an outside deposition process such as VAD then the above referred-to process step typically is the sintering step. The sintering step involves maintaining the porous silica-based body produced by "soot" deposition at an elevated temperature such that collapse of the pores can take place, such that a pore-free glass body results. The sintering temperature typically is conventional (e.g., 1400°-1600° C.), but the sintering atmosphere differs from the conventionally used He atmosphere. According to the invention the sintering atmosphere contains an amount of reducing gas or gases (e.g., H$_2$, CO) that is effective to produce the desired at least 30 db/m.mole % GeO$_2$ loss above background at 330 nm.

If the preform body is made by a sol/gel process, then the above-referred to process step again typically is the sintering step, substantially as described in the preceding paragraph.

In some cases it may also be desired to increase the GeO concentration in a Ge-doped silica-based glass rod. Such a rod (frequently referred-to as "core rod") can be produced by any appropriate process (e.g., VAD, sol/gel, OVD). The increase in GeO concentration can be brought about by maintaining the rod at a temperature above about 1000° C. in a H$_2$-containing atmosphere for a time sufficient to result in increase of the loss above background at 330 nm to at least 30 db/m.mole%GeO$_2$. After attainment of the desired GeO concentration, the core rod typically is overclad with appropriate glass (e.g., by shrinking a silica tube around the rod, or by deposition of silica onto the rod), and fiber is drawn from the thus produced composite body.

In a further embodiment of the inventive process the relevant process step is the drawing of the fiber from the preform (the preform produced by any appropriate process). The drawing is carried out such that the hot fiber is contacted with a substantially oxygen-free atmosphere that comprises an effective amount of H$_2$ such that the desired loss above background of at least 30 db/m.mole % GeO$_2$ at 330 nm results.

Fiber according to the invention can be exposed to actinic radiation in a known manner to effect the desired periodically varying change in core refractive index. Typically the required exposure intensity and/or time will be substantially less than is required for prior art fiber of identical Ge-content. Fiber that contains a thus produced in-line grating can be used in substantially the same manner as prior art fiber gratings.

FIG. 1 schematically depicts exemplary apparatus according to the invention, namely, sensor system 20. Radiation from signal source 21 is transmitted through conventional optical fiber 22 through filter 23 to analyzer 24. The filter comprises fiber according to the invention that contains an in-line Bragg grating. Exemplarily the signal source provides wide band radiation. Since filter action (e.g., the center wavelength of the stop band) is a sensitive function of, e.g., temperature or strain, with changes in the filter action being readily detectable by, e.g., a spectrum analyzer, apparatus 20 can serve to monitor temperature, strain, or other parameters. See, for instance, J. R. Dunphy et al., which is part of the previously referred-to United Technologies product literature.

EXAMPLE 1.

In a 19×25 mm diameter commercially available vitreous silica tube were deposited 10 layers of fluorophosposilicate cladding glass, followed by 1 layer of germanosilicate core glass. Deposition was by conventional MCVD, with precursor flows adjusted such that the cladding glass had a refractive index difference $\Delta^-$ of 0.1%, and the core glass had $\Delta^+$ of 0.3%. This nomenclature is conventional and known to those skilled in the art.

The thus produced preform tube was collapsed in conventional fashion except that gas flows were adjusted such that the atmosphere in the tube was about 95% He and 5% Cl$_2$. The tube wall temperature was about 2400° C. O$_2$ partial pressure was estimated to be less than 1 Torr. After completion of the collapse, fiber was drawn from the preform in conventional manner. The fiber was analyzed by measurement of the fluorescence produced by exposure to 254 nm radiation. The measurements were carried out substantially as described in R. M. Atkins, *Technical Digest of the Symposium on Optical Fiber Measurements*, Boulder, Colo., 1990, pp. 155-158. The observed fluorescence was at least about 10 times higher than that observed in analogous fiber that was produced by the conventional process, i.e., that differed from the above-described process only with regard to the collapse atmosphere (the atmosphere in the conventional process was 95% O$_2$/5% Cl$_2$). The at least 10-fold increase in fluorescence reliably predicts an approximately 10-fold increase in the GeO/GeO$_2$ ratio. These fluorescence measurements predict that loss measurements at 330 nm would show a loss above background of more than 30 db/m.mole % GeO$_2$. A grating can be produced in the fiber by any appropriate technique, e.g., the holographic technique of Meltz et al. (op. cit.)

EXAMPLE 2.

A porous silica-based rod, with germanosilicate central portion surrounded by a silica cladding, is produced by conventional VAD. Dehydration is carried out at 1100° C. in 95% He/5% Cl$_2$. Following dehydration the temperature is raised to 1600° C. and the atmosphere changed to 90% He/5% $Cl_2$/5% $H_2$. These conditions are maintained until consolidation is complete. Fiber is drawn from the thus produced preform in conventional manner. The fiber exhibits at least a 10-fold increased fluorescence when exposed to 254 nm radiation, as compared to a fiber produced as described above, except that consolidation is carried out in 95% He/5% $Cl_2$. This predicts an approximately 10-fold increase in the $GeO/GeO_2$ ratio.

What is claimed is:

1. Apparatus comprising a silica-based optical fiber comprising a core and a cladding region surrounding the core, the core comprising silica and germanium oxide, associated with the fiber is a loss above background for conducted actinic radiation of wavelength 330 nm and an effective core refractive index, the apparatus being adapted for operation at an operating wavelength $\lambda_{op}$;

CHARACTERIZED IN THAT at least a portion of the fiber has a loss above background for conducted actinic radiation of wavelength 330 nm that is at least 30 db/m.mole % $GeO_2$, where mole % $GeO_2$ refers to the concentration of $GeO_2$ in the core that is associated with the effective core refractive index at $\lambda_{op}$ and said loss above background is a function of a substantial $Ge^{+2}$ concentration per unit concentration of germanium in the core of the fiber.

2. Apparatus of claim 1, wherein in said at least a portion of the fiber the core effective refractive index varies, as a function of distance along the fiber, repeatedly between about $n_{max}$ and $n_o$, where $n_{max}$ and $n_o$ are, respectively, the maximum and minimum effective core refractive index, said at least portion of the fiber to be termed the grating.

3. Apparatus of claim 2, wherein the apparatus is a communication system comprising an optical fiber signal transmission path that comprises optical amplifier means and at least one grating, said amplifier means comprising means for injecting pump radiation of wavelength $\lambda_p < \lambda_{op}$ into said transmission path, the variation of the core refractive index as a function of distance along the grating being selected such that the grating substantially reflects the pump radiation.

4. Apparatus of claim 2, wherein $(n_{max}-n_o)/n_o > 10^{-4}$.

* * * * *